(12) United States Patent
Marquier

(10) Patent No.: US 12,235,661 B2
(45) Date of Patent: Feb. 25, 2025

(54) THERMOSTATIC DEVICE

(71) Applicant: VERNET, Ollainville (FR)

(72) Inventor: Samuel Marquier, Evry (FR)

(73) Assignee: VERNET, Ollainville (FR)

( * ) Notice: Subject to any disclaimer, the term of this patent is extended or adjusted under 35 U.S.C. 154(b) by 254 days.

(21) Appl. No.: 18/001,022

(22) PCT Filed: Jun. 11, 2021

(86) PCT No.: PCT/EP2021/065796
§ 371 (c)(1),
(2) Date: Dec. 7, 2022

(87) PCT Pub. No.: WO2021/250245
PCT Pub. Date: Dec. 16, 2021

(65) Prior Publication Data
US 2023/0221740 A1    Jul. 13, 2023

(30) Foreign Application Priority Data

Jun. 12, 2020   (FR) ..................................... 2006154

(51) Int. Cl.
*G05D 23/13* (2006.01)
*F16K 11/00* (2006.01)
(Continued)

(52) U.S. Cl.
CPC ........ *G05D 23/1346* (2013.01); *F16K 11/044* (2013.01); *F16K 19/006* (2013.01); *F16K 31/002* (2013.01)

(58) Field of Classification Search
CPC ............. G05D 23/1346; G05D 23/132; G05D 23/143; F16K 11/44; F16K 19/006; F16K 31/002
See application file for complete search history.

(56) References Cited

U.S. PATENT DOCUMENTS 7,673,808 B2   6/2010 Mace et al.
9,134,737 B2   9/2015 Menet
(Continued)

FOREIGN PATENT DOCUMENTS

| GB | 777741 A | 6/1957 |
|---|---|---|
| WO | 2005124495 A1 | 12/2005 |
| WO | 2010097545 A1 | 9/2010 |

OTHER PUBLICATIONS

Search Report for French Application No. FR 2006154 dated Feb. 14, 2021.
(Continued)

*Primary Examiner* — Marc E Norman
(74) *Attorney, Agent, or Firm* — McDonald Hopkins LLC

(57) ABSTRACT

A thermostatic device includes: a housing and a regulator, the one moving in translation with respect to the other in order to regulate the rate of water flow; a thermoactuator comprising a primary part and a secondary part moving in translation depending on the temperature, the primary part and the regulator being translationally fixed; a slide, that can move in translation with respect to the housing and is rotationally fixed with respect to the housing; and an overtravel spring applying a primary return force on the slide. In order to absorb an overtravel of the thermoactuator while improving compactness and the ease of manufacture, the overtravel spring bears against the housing and the thermostatic device comprises a rotary drive part in helical connection with the slide and being fixed in translation with respect to the secondary part.

11 Claims, 8 Drawing Sheets

(51) Int. Cl.
*F16K 11/044* (2006.01)
*F16K 31/00* (2006.01)

(56) References Cited

U.S. PATENT DOCUMENTS

| | | | | |
|---|---|---|---|---|
| 2002/0148040 | A1* | 10/2002 | Mateina | E03C 1/05 |
| | | | | 4/675 |
| 2019/0204858 | A1 | 7/2019 | Lange | |
| 2022/0107658 | A1* | 4/2022 | Pottie | G05D 23/134 |
| 2023/0129850 | A1* | 4/2023 | Robin | E03C 1/0403 |
| | | | | 137/15.21 |
| 2024/0003453 | A1* | 1/2024 | Marquier | F16K 27/0263 |

OTHER PUBLICATIONS

Search Report for International Application No. PCT/EP2021/065796 dated Sep. 9, 2021.

\* cited by examiner

THERMOSTATIC DEVICE

CROSS-REFERENCE TO RELATED APPLICATIONS

This is a National Stage application of PCT international application PCT/EP2021/065796, filed on Jun. 11, 2021, which claims priority from French Patent Application No. 20 06154, filed on Jun. 12, 2020, both which are incorporated herein by reference in their entirety.

The present invention relates to a thermostatic device.

The present invention relates to the technical field of fittings, in particular for sanitary use.

WO2005124495 describes a thermostatic control cartridge for a thermostatic valve, which mixes a cold water flow with a hot water flow to form a mixed water flow. The thermostatic cartridge comprises a spool that can be moved in translation, the position of which determines the particular flow rate of the hot and cold water flows to form the mixed water flow, thereby allowing the temperature of the mixed water flow to be changed. The position of the spool is controlled by a pivoting control element that can be operated by a user. For this purpose, the spool is attached to an adjusting screw, the adjusting screw being moved in translation by pivoting the control element, forming a screw-nut system with the control element. In order to ensure thermostatic regulation of the mixture depending on the temperature of the mixed water flow, the spool is moved by the adjusting screw via a thermostatic element, one heat-sensitive part of which carries the spool. The thermostatic element is interposed between a return spring, which bears against the housing via the spool, and a support carried by the adjusting screw, such that the spool can be moved relative to the support, i.e. relative to the screw.

An overtravel spring is interposed between the adjusting screw and the support to prevent the cartridge from breaking when the spool is in the end position. When the spool is in said position, if necessary, the support can be pressed into the adjusting screw by the thermostatic element, against the overtravel spring, while the thermostatic element bears against the housing via the spool in the end position.

Because of this series arrangement of the screw-nut system, overtravel spring and thermostatic element, it is difficult to produce cartridge that is axially compact. To improve axial compactness, one idea would be to nest the screw-nut system, overtravel spring and thermostatic element to be within each other. However, this would lead to complex and structurally fragile parts that are difficult to manufacture, especially for the adjusting screw and the support. Therefore, to compensate for the structural fragility of these parts due to their complex shape, it may be necessary to make them out of a metal material, which is relatively difficult and expensive to manufacture, compared to a polymer plastic.

The invention therefore aims in particular to remedy the above-mentioned disadvantages by providing a novel thermostatic device which, while absorbing an overtravel of a thermoactuator, is more compact and easier to manufacture.

The invention relates to a thermostatic device comprising a housing, which is configured to conduct water flows therein. The thermostatic device comprises a regulator, which is contained within the housing, the regulator and the housing being movable in translation relative to each other along a longitudinal axis of the housing, to regulate the flow rate of at least one of said water flows. The thermostatic device comprises a thermoactuator, which is contained in the housing so as to be immersed in one of said water flows, the thermoactuator comprising a primary part and a secondary part which move in translation relative to each other along the longitudinal axis, depending on the temperature of the water flow in which the thermoactuator is immersed, the primary part and the regulator being fixed in translation relative to each other along the longitudinal axis. The thermostatic device comprises a slide, the slide and the housing being movable in translation relative to each other along the longitudinal axis, and fixed in rotation relative to each other about the longitudinal axis. The thermostatic device comprises an overtravel spring, which applies a primary return force on the slide along the longitudinal axis.

According to the invention, in order to apply the primary return force on the slide, the overtravel spring bears against the housing along the longitudinal axis. In addition, the thermostatic device further comprises a rotatable drive part, the rotatable drive part and the slide being helically connected to each other along and about the longitudinal axis, the rotatable drive part and the secondary part being fixed in translation relative to each other along the longitudinal axis.

One idea behind the invention is to provide that the overtravel spring and the helical connection are in parallel with each other, so as to facilitate a coaxial arrangement of the parts performing these functions in order to reduce the axial, or even radial, space required by the thermostatic device. In this way, the overtravel spring applies the primary return force to a screw-nut system of the thermostatic device, consisting of the rotary drive part and the slide, by bearing directly against the housing. In this case, this primary return force is applied directly on the slide by the overtravel spring. In particular, the overtravel spring can be arranged so as to radially surround all or part of the slide and the rotary drive part, thereby reducing the space required. Furthermore, the slide and the rotary drive part are of particularly simple, compact and structurally strong design, the invention dispensing with the need to interpose a spring between the screw-nut system and the thermoactuator or to accommodate a spring within the screw-nut system. Advantageously, the slide and the rotary drive part can each be made of a single monolithic piece of polymeric plastic material.

Advantageously, it follows from these provisions that, in an overtravel configuration of the thermostatic device, the secondary part of the thermoactuator can move the slide in translation with respect to the housing along the longitudinal axis, by means of the rotary drive part, by bearing against the regulator, when the regulator bears against the housing. The thermostatic device is therefore able to absorb the overtravel of the thermoactuator with reduced space requirements and complexity. Furthermore, it advantageously follows from these provisions that, in a base configuration of the thermostatic device, the slide and the housing are advantageously held fixed relative to each other in translation along the longitudinal axis, under the action of the primary return force. In order to control the regulator in this base configuration, the rotary drive part is rotated relative to the housing and the slide about the longitudinal axis, for example, by means of a control element which can be operated by a user. In other words, the regulator is moved with the aid of the rotary drive part via the thermoactuator, so that the rotary drive part has a function as a control part of the regulator. More precisely, the rotation of the rotary drive part causes, by means of a helical connection, a translation of said rotary drive part, and thus of the secondary part of the thermoactuator, relative to the housing along the longitudinal axis, while the regulator translates integrally with the primary part of the thermoactuator along the longitudinal axis. As the regulator and the primary part of the thermoactuator are fixed in translation relative to each other along the longitudinal axis, the translation of the regulator is thermally controlled by the thermoactuator, depending on the temperature of the water flow in which the thermoactuator is immersed.

Preferably, the thermostatic device comprises a control element which projects from the housing so as to be operated by a user with respect to the housing. Preferably, the control element and the housing are: fixed relative to each other in translation along the longitudinal axis; and movable relative to each other in rotation about the longitudinal axis. Preferably, the control element and the rotary drive part are: movable relative to each other in translation along the longitudinal axis; and fixed relative to each other in rotation about the longitudinal axis.

Preferably, the regulator and the housing are movable relative to each other in translation along the longitudinal axis to a first end position of the regulator relative to the housing, in which the regulator abuts the housing along the longitudinal axis. Preferably, the slide and the housing are movable relative to each other in translation along the longitudinal axis to a base position, in which the slide abuts the housing along the longitudinal axis.

Preferably, the thermostatic device is configured to move between: a base configuration, in which the slide is held in the base position under the action of the primary return force; and an overtravel configuration, in which, while the regulator is in the first end position, the slide is moved away from the base position by the rotary drive part, against the primary return force, under the action of the thermoactuator.

Preferably, the housing comprises a transverse wall through which the thermoactuator passes, with the slide, the overtravel spring and the rotary drive part being arranged on one side of the transverse wall and the regulator being arranged on another side of the transverse wall. Preferably, the regulator and the housing are movable relative to each other along the longitudinal axis to a second end position of the regulator relative to the housing, opposite to the first end position, in which the regulator abuts the housing along the longitudinal axis, preferably against the transverse wall.

Preferably, the slide comprises external axial grooves, the housing comprises internal axial grooves, and the internal axial grooves and the external axial grooves cooperate with each other so that the slide and the housing are movable relative to each other in translation along the longitudinal axis, and fixed relative to each other in rotation about the longitudinal axis.

Preferably, the rotary drive part comprises an external thread centred on the longitudinal axis, the slide comprises an internal thread centred on the longitudinal axis, and the internal thread and the external thread co-operate with each other so that the rotary drive part and the slide are in helical connection with each other along and about the longitudinal axis, the slide surrounding the rotary drive part about the longitudinal axis.

Preferably, the overtravel spring comprises a helical compression spring centred on the longitudinal axis. Preferably, the overtravel spring is interposed along the longitudinal axis between the slide and an axial surface forming part of the housing, and is arranged so as to surround the internal thread.

Preferably, the thermostatic device further comprises a return spring which: applies a secondary return force on the primary part of the thermoactuator or on the regulator along the longitudinal axis, bearing against the housing along the longitudinal axis. Preferably, the primary return force and the secondary return force are in opposite directions, and the overtravel spring and the return spring are configured such that the primary return force is greater than the secondary return force.

Preferably, in order for the rotary drive part and the secondary part to be fixed relative to each other in translation along the longitudinal axis, the thermoactuator and the rotary drive part are held in abutment against each other along the longitudinal axis under the action of the secondary return force.

Preferably, the thermoactuator is configured such that, as the temperature increases, the secondary part moves relative to the primary part along the longitudinal axis in a direction opposite to the direction of the primary return force.

Preferably, the thermostatic device comprises a mixer, which is formed by the regulator and/or by a mixing compartment that forms part of the housing, the mixer being configured to form an outgoing water flow by mixing two incoming water flows, the incoming water flows and the outgoing water flow forming part of the water flows conducted in the housing. Preferably, the position of the regulator relative to the housing along the longitudinal axis controls the flow rate of the incoming water flows to determine the proportion of the incoming water flows forming the outgoing water flow.

The invention will be better understood from the description below, which is given only as a non-limiting example, with reference to the drawings listed below.

FIGS. 1 to 5 show a thermostatic device according to a first embodiment in accordance with the invention. This thermostatic device is preferably for sanitary use, being connected to a sanitary water network, for example, for a dwelling or professional premises.

The thermostatic device is in the form of a thermostatic cartridge, which, for connection to the sanitary water system, is intended to be coupled to a base so as to form a fitting system together. The fitting system is preferably a wall-mounted system, the base being intended to be partially embedded in a wall, or more generally in a masonry wall, whatever its orientation. The fitting system is preferably a mixer tap for a shower or bath, the base being designed, for example, to supply a shower head, a shower head and/or a bath spout. Alternatively, the base forms the base of a sink or washbasin tap, the tap further comprising a washbasin spout.

Figure 1:
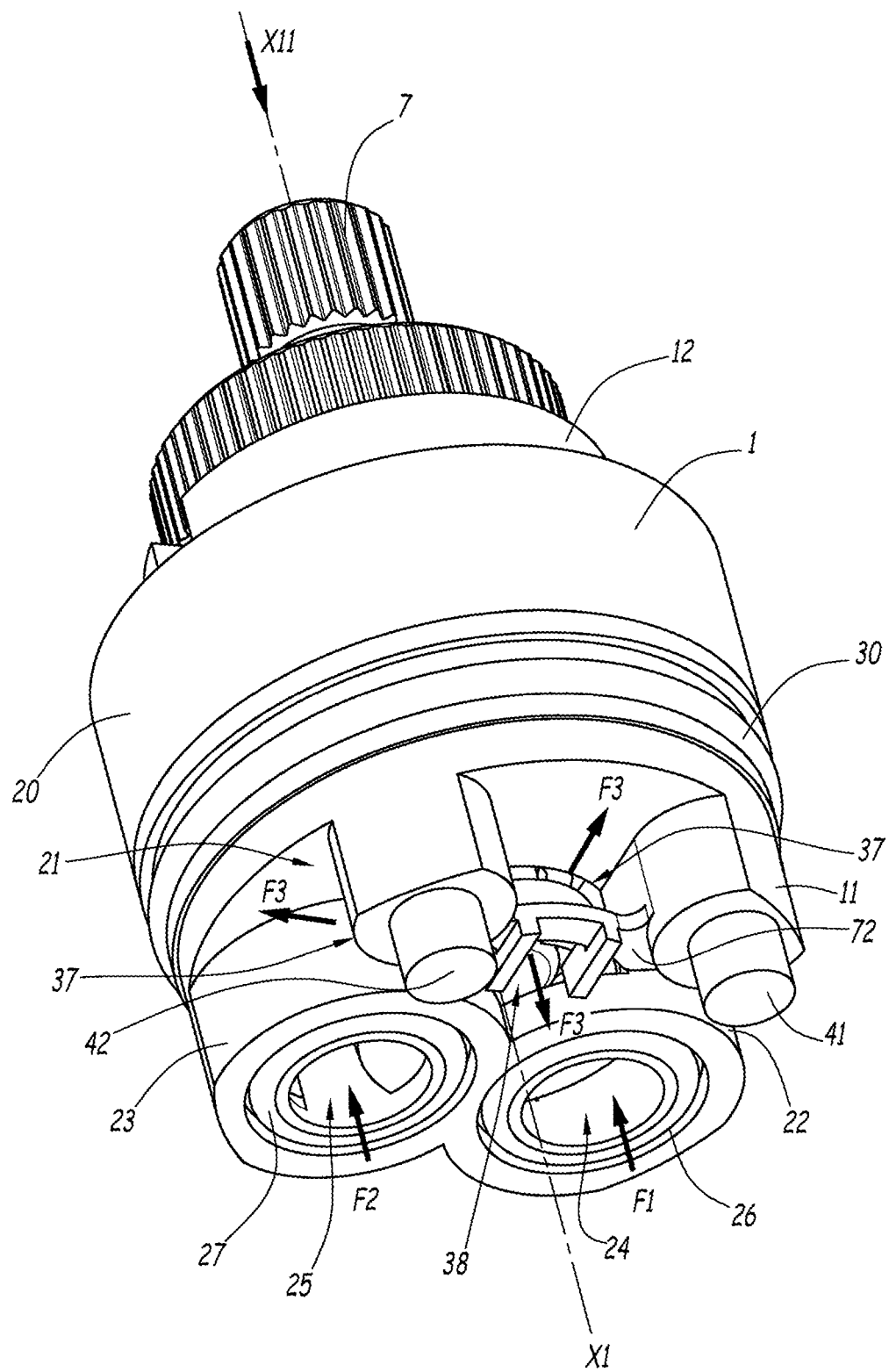
FIG. 1 is a perspective view of a thermostatic device according to a first embodiment of the invention.
Figure 2:
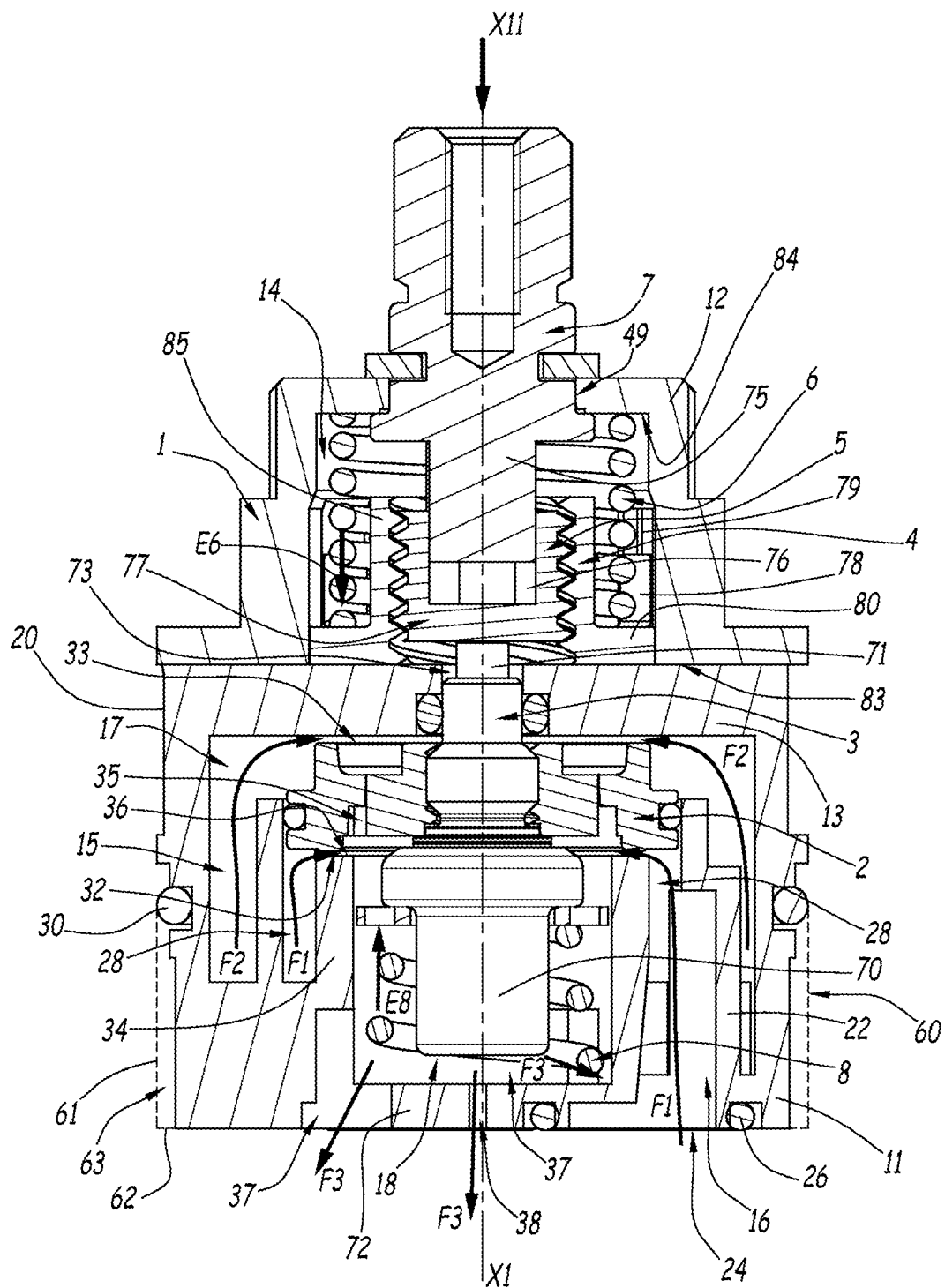
FIG. 2 is a first longitudinal cross section of FIG. 1.
Figure 3:
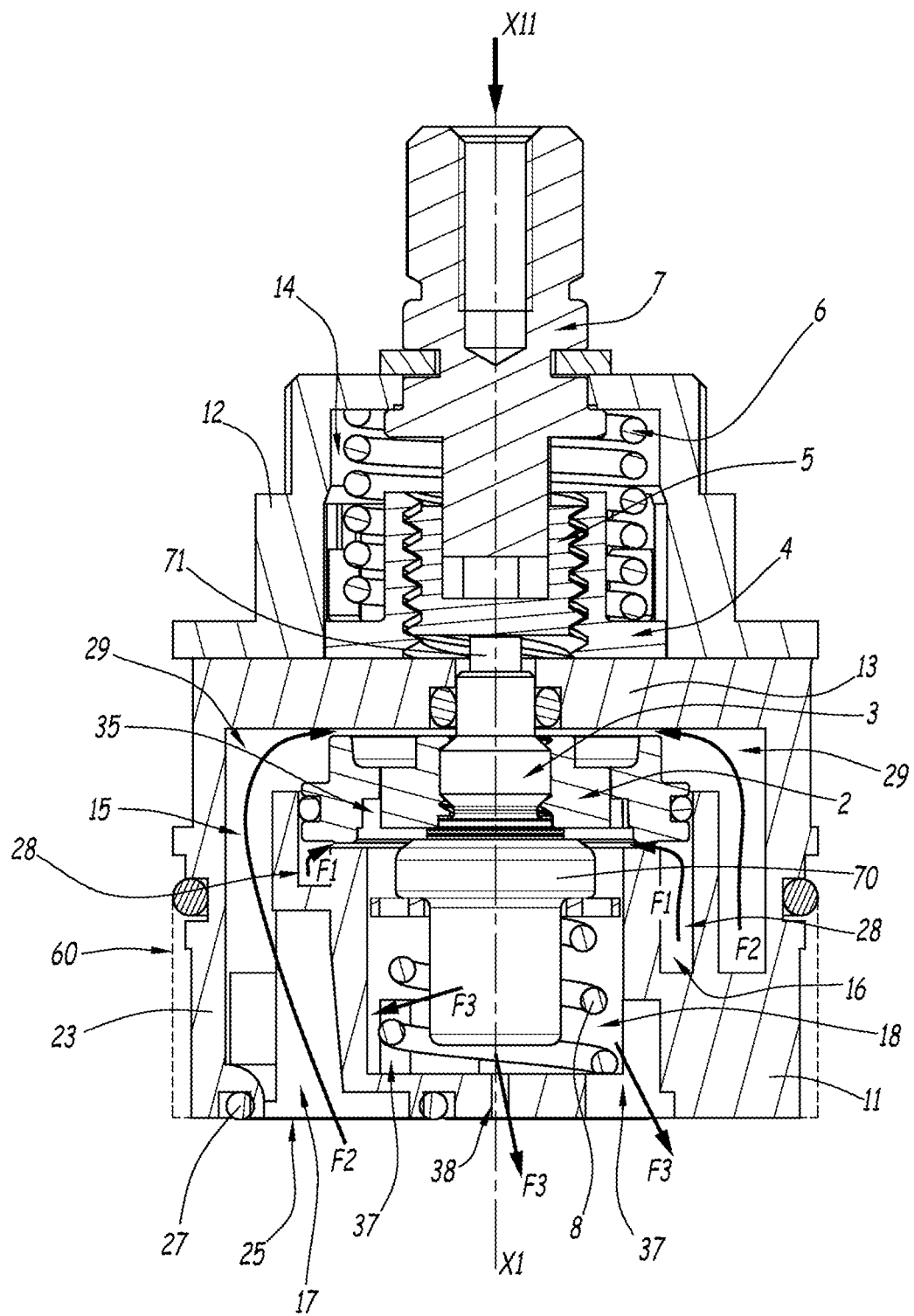
FIG. 3 is a second longitudinal cross section of FIG. 1.

As shown in FIGS. 1 to 3, the thermostatic device comprises a housing 1, as well as a regulator 2, a thermoactuator 3, a slide 4, a rotary drive part 5 and an overtravel spring 6, which are contained in the housing 1. Preferably, the thermostatic device further comprises a control element 7, which partially protrudes from the housing, and a return spring 8, which is contained in the housing 1.

The housing 1 is designed to be the focal point of a circulation of water flows, in this case water flows F1, F2 and F3, which are exchanged between the thermostatic device and the base when the device is coupled to said base.

The device defines a longitudinal axis X1, which is fixed with respect to the housing 1. Preferably, the regulator 2, the thermoactuator 3, the slide 4, the rotary drive part 5, the spring 6, the element 7 and the spring 8 are centred on the axis X1, and are therefore traversed by this axis X1.

Figure 4:
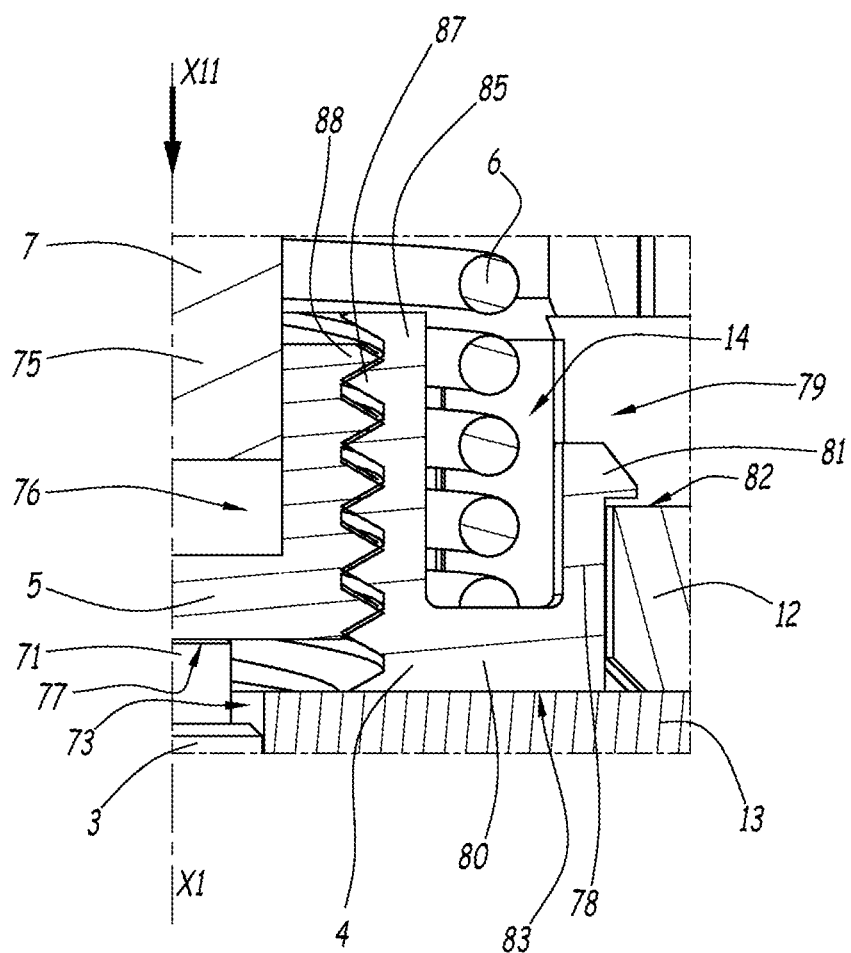
FIG. 4 is a partial longitudinal cross section of FIG. 1.

Unless otherwise stated, expressions such as "radial", "axial", "coaxial", "longitudinal" and "transverse" refer to the longitudinal axis X1. The cross sections in FIGS. 2, 3 and 4 are in three different planes including the axis X1.

The housing 1 comprises a base plate 11, through which the axis X1 passes and by means of which the thermostatic device can be coupled to the base. The base plate 11 is provided at a first axial end of the housing 1, shown towards the bottom in FIGS. 2 and 3. The housing 1 also comprises a cover 12, through which the axis X1 passes, which forms another axial end of the housing 1, opposite the base plate 11. The cover 12 and the base plate 11 are thus distributed along the axis X1. The cover 12 is passed through by the control element 7 and is firmly connected to the base plate 11. A base direction X11 parallel to the axis X1 is defined with respect to the housing 1, which runs from the cover 12 to the base plate 11, or from the overtravel spring 6 to the thermoactuator 3.

Preferably, as can be seen in FIGS. 1 to 3, the housing 1 externally has a generally circular shape about the axis X1, which is the case for the base plate 11 and the cover 12. To this end, part of the base plate 11 and the cover 12 form an outer peripheral wall of the housing 1, surrounding the axis X1. Between the axial ends of the housing 1, the base plate 11 and the cover 12 form, for example, a succession of cylindrical walls with circular bases along the axis X1, which are all centred on the axis X1.

Internally, the housing 1 preferably comprises a transverse wall 13, which is, for example, formed by the base plate 11. The wall 13 is traversed by the axis X1 and is preferably orthogonal to the axis X1. In the example, the wall 13 occupies a cross section of the housing 1, separating the housing into a compartment 15 delimited by the base plate 11, and a compartment 14 delimited by the cover 12. The compartments 14 and 15 are distributed along the axis X1, with compartment 15 being arranged in the direction X11 with respect to compartment 14.

The compartment 14 can be described as a "control compartment", substantially containing the slide 4, the rotary drive part 5, the overtravel spring 6 and part of the control element 7. In the present example, the cover 12 has a bell shape which is open in the direction X11, forming an opening 83 at the axial end thereof. When the housing 1 is assembled, the cover 12 is fixed to the base plate 11, so that the base plate 11, in particular the wall 13, closes this opening 83, to delimit the compartment 14 in the direction X11.

The compartment 15 can be described as a "mixing compartment", containing the regulator 2, part of the thermoactuator 3 and the spring 8, and being the focal point of the circulation of the water flows F1, F2 and F3. The base plate 11 is preferably sealed, whereas the compartment 14 is advantageously not traversed by any water flow. As an alternative, however, the compartment 14 could be flooded by the mixed water flow F3, the compartment 14 then being sealed from the outside and from compartment 15, while being fluidically connected to compartment 15 by passages suitable for the circulation of the water flow F3.

In any case, it is advantageous that the slide 4, the part 5 and the spring 6 are arranged on one side of the wall 13, while the regulator 2 is arranged on the other side of the wall 13 so as to be separated from the slide 4, the part 5 and the spring 6.

Here, the water flows F1 and F2 are incoming water flows, which are admitted into the housing 1 from the base, when the housing 1 is coupled to the base. The water flow F3 is an outgoing water flow, which is discharged from the housing 1 and transmitted to the base when the housing is coupled to the base. Flows F1 and F2 are advantageously water flows coming from a sanitary water network supplying the base. Flow F3 is advantageously used to supply the spout of the tap or the shower head of the fitting system.

In the present example, as detailed below, the regulator 2 and the mixing compartment 15 together form a mixer, which, when the housing 1 is coupled to the base, is configured to form the outgoing water flow F3, by mixing the flows F1 and F2 admitted into the housing 1. Preferably, the device is designed so that the flow F1 is a hot water flow while the flow F2 is a cold water flow. "Cold water" is understood to mean unheated running water, which is generally at a temperature slightly below or equal to the ambient temperature. "Hot water" is understood to mean running water that has been heated by a sanitary heating system. More generally, hot water has a higher temperature than cold water. Therefore, the water flow F3 resulting from the mixing of flows F1 and F2 by the mixer is at an intermediate temperature between those of flows F1 and F2, which depends on the proportion of flows F1 and F2 for the mixture. The flow F3 can be described as a mixed water flow and the thermostatic device as a thermostatic mixing device.

The housing 1 comprises an inlet chamber 16 for conducting the water flow F1 within the housing 1 from the base to the regulator 2. The housing 1 comprises an inlet chamber 17 for conducting the water flow F2 within the housing 1 from the base to the regulator 2. The housing 1 comprises an outlet chamber 18 for conducting the water flow F3 within the housing 1 from the regulator 2 to the base. The chambers 16, 17 and 18 together form the compartment 15 for mixing the flows F1 and F2 to form the flow F3, with the assistance of the regulator 2.

In the present example, the base plate 11 advantageously comprises a ring 20 and a bottom wall 21. The ring 20 connects the wall 13 to the bottom wall 21. The ring 20 forms a peripheral wall of the housing 1, in particular of the base plate 11, which radially delimits the compartment 15. The ring 20 is generally circular about the axis X1, i.e. centred on the axis X1. The bottom wall 21 is a transverse wall, for example, a wall orthogonal to the axis X1, which occupies the cross section of the ring 20 to close the housing 1 at one of the axial ends thereof. More generally, the base plate 11 closes the housing 1 at one of the axial ends thereof. The compartment 15 extends axially from the wall 13 to the axial end of the housing 1 in the direction X11, the bottom wall 21 being arranged between this end and the wall 13.

Preferably, when the housing 1 is coupled to the base, the base plate 11 is received in a receptacle 60 forming part of the base, the base plate 11 and the receptacle 60 being complementary. The receptacle 60 is shown schematically in dotted lines in FIGS. 2 and 3. The base plate 11 forms a male part while the receptacle 60 of the base forms a complementary female part.

Preferably, as can be seen in FIG. 1, the housing 1 has pins 41 and 42, i.e. rods which project parallel to the axis X1, and which are designed to cooperate with complementary guides which open into the receptacle 60. The pins 41 and 42, which are plugged into the guides, constitute a locator which ensures that the positioning of the housing in the receptacle 60 is correct for the coupling, in particular for the orientation of the housing 1 in relation to the base about the axis X1.

Advantageously, the thermostatic device comprises a circular peripheral seal 30, such as an O-ring, which is centred on the axis X1. The seal 30 is carried by the ring 20, by surrounding the ring 20. When the housing 1 is coupled to the base, the seal 30 is in radial contact with a peripheral wall 61 of the receptacle 60 to ensure a watertight seal of the coupling, as illustrated in FIGS. 2 and 3. Advantageously, the wall 61 is circular about an axis of the base, which is coaxial with the axis X1 when the housing 1 is coupled. When the housing 1 is coupled, the peripheral wall 61 surrounds the base plate 11. The base receptacle 60 has a bottom wall 62, which is transverse and closes the wall 61. When the housing 1 is coupled, the wall 62 is traversed by the axis X1 and is preferably orthogonal to the axis X1. When the housing 1 is coupled, the thermostatic device advantageously comes into axial abutment along the direction X11 against the wall 62.

The receptacle 60, which is open when the housing 1 is not coupled, is sealed by the base plate 11 when the housing 1 is coupled, due to the fact that the seal 30 is interposed radially between the ring 20 and the wall 61. In the mated configuration, the base plate 11 and the receptacle 60 together define an interstitial chamber 63. A watertight seal between the chamber 63 and the outside of the valve system is then provided by the seal 30.

As can be seen in FIGS. 1 and 2, the base plate 11 advantageously comprises a duct 22, which projects from the bottom wall 21 and delimits part of the chamber 16. The cross-sectional plane in FIG. 2 passes through the duct 22. The duct 22 extends, for example, parallel to the axis X1. The duct 22 terminates in an opening 24, known as the "base plate opening", which opens to the outside of the housing 1. When the housing 1 is coupled to the base, the base plate opening 24 is fluidly connected with a first base opening which opens into the receptacle 60, here provided in the wall 62. Through this fluid connection, the chamber 16 is brought into communication with the base opening. By complementing the base plate 11 and the base, the fact of coupling the housing 1 with the base automatically connects the opening 24 with the corresponding opening of the base. To ensure the tightness of this connection, the device advantageously comprises a seal 26, referred to as the "internal seal", which surrounds the base plate opening 24 and is carried by the base plate 11. The seal 26 is axially interposed between the base plate 11 and the bottom wall 62 of the base when the housing 1 is coupled to the base, as shown schematically in FIG. 2. The inflow F1 enters the housing 1, in particular the chamber 16, through the opening 24 carried by the base plate 11. The inflow F1 is led into the housing 1 through the base opening connected to the opening 24.

The duct 22 delimits a first part of the chamber 16, which is substantially parallel to the axis X1, and which extends from the opening 24 to the bottom wall 21. Between the bottom wall 21 and the wall 13, a second part 28 of the chamber 16 is defined by the housing 1, and advantageously has an annular shape about the axis X1. This part 28 can be seen in FIGS. 2 and 3.

As can be seen in FIGS. 1 and 3, the base plate 11 advantageously comprises a duct 23, which projects from the bottom wall 21 and delimits part of the chamber 17. The cross-sectional plane in FIG. 3 passes through the duct 23. The duct 23 extends, for example, parallel to the axis X1. The duct 23 terminates in an opening 25, referred to as the "base plate opening", which opens to the outside of the housing 1. When the housing 1 is coupled to the base, the base plate opening 25 is fluidly connected with a second base opening which opens into the receptacle 60, here provided in the wall 62. Through this fluid connection, the chamber 17 is brought into communication with this second base opening. In other words, each opening 24 and 25 is connected to a particular base opening, the two base openings being distinct. By complementing the base plate 11 and the base, coupling the housing 1 with the base automatically connects the opening 25 with its corresponding base opening. To ensure the tightness of this connection, the device advantageously comprises a seal 27, referred to as the "internal seal", which surrounds the base plate opening 25 and is carried by the base plate 11. The seal 27 is axially interposed between the base plate 11 and the bottom wall 62 of the base when the housing 1 is coupled to the base, as shown schematically in FIG. 3. The inflow F2 enters the housing 1, in particular the chamber 17, through the opening 25 carried by the base plate 11. The inflow F2 is led into the housing 1 through the base opening connected to the opening 25.

The duct 23 delimits a first part of the chamber 17 which is substantially parallel to the axis X1, and which extends from the opening 25 to the bottom wall 21. Between the bottom wall 21 and the wall 13, a second part 29 of the chamber 17 is defined by the housing 1, and has an advantageous annular shape about the axis X1. This part 29 can be seen in FIGS. 2 and 3.

The annular part 29 of the chamber 17 and the annular part 28 of the chamber 16 are therefore preferably coaxial, being nested one inside the other and/or one above the other between the wall 13 and the bottom wall 21. In the present example, the annular part 28 of the chamber 16 is delimited axially by the bottom wall 21, at its periphery by the annular portion 29 of the chamber 17, and internally by a wall 34, which is preferably circular, or has a cross-sectional shape, about the axis X1. In the example, the annular part 29 of the chamber 17 is delimited axially by the wall 13, internally by a wall which separates the annular part 29 from the annular part 28 of the chamber 16, and externally by the ring 20.

Both chambers 16 and 17 open out into the regulator 2. In this example, the regulator 2 is a drawer. The regulator 2 is arranged in the compartment 15 at a point where chambers 16 and 17 meet. The regulator 2 is, for example, of discoidal shape perpendicular to the axis X1, so as to have two opposite axial faces 32 and 33, the axial face 33 facing the wall 13, i.e. opposite the direction X11, and the face 32 facing in the direction X11. In particular, the annular part 28 opens onto the face 32, while the annular portion 29 opens onto the face 33.

Whatever the design of the chambers 16 and 17, their purpose is to fluidly connect the base plate openings 24 and 25, respectively, to the regulator 2, so that the flows F1 and F2 reach the regulator 2.

The regulator 2 is movable relative to the housing 1 to regulate the flow rate of the flows F1 and F2. More precisely, the regulator 2 and the housing 1 are movable relative to each other in translation along the axis X1, which makes it possible to regulate the flow rate of the water flows F1 and F2. This means that the regulator 2 has a degree of freedom in relation to the housing 1, for translation parallel to the axis X1. It can be foreseen that the regulator 2 and the housing 1 are fixed in relation to each other in rotation around the axis X1. This means that the regulator 2 has no degree of freedom relative to the housing 1 in rotation about the axis X1. However, the regulator 2 and the housing 1 could be movable relative to each other in rotation about the axis X1.

In the direction X11, the regulator 2 can be moved relative to the housing 1 up to an end position, where the flow F1 is completely interrupted, so as to have a zero flow rate, and where the flow F2 is not limited, so as to have a maximum flow rate. In this end position, the regulator 2 closes the chamber 16 while chamber 17 is left fully open. The chamber 17 is left open by forming an annular gap between the wall 13 and the axial face 33 of the regulator 2. The chamber 16 is closed by closing an annular gap between the face 32 of the regulator 2 and an upper edge 36 of the wall 34, which edge 36 defines the opening of the chamber 16 on the regulator 2. In this end position, the regulator 2 is in axial abutment with the housing 1, in particular with the upper edge 36. Axially, the edge 36 is preferably arranged between the wall 13 and the bottom wall 21.

In a direction opposite to the direction X11, the regulator 2 can be moved relative to the housing 1 to another end position, where the flow F2 is completely interrupted, so as to have a zero flow rate, and where the flow F1 is not limited, so as to have a maximum flow rate. In this alternative end position, the regulator 2 closes the chamber 17 while the chamber 16 is left fully open. In this further end position, the regulator 2 is in axial abutment with the housing 1, in particular with the wall 13. The chamber 17 is closed by the axial face 33 of the regulator 2 abutting against the wall 13. The chamber 16 is left fully open by opening the gap between the axial face 32 of the regulator 2 and the upper edge 36 of the wall 34.

In FIGS. 2 and 3, the regulator 2 is shown in an intermediate position where the flows F1 and F2 are limited by the regulator 2, for example, equally, to an intermediate flow rate between zero and maximum flow rate. In this intermediate position, each of the chambers 16 and 17 is partially closed by the regulator 2, preferably equally.

In summary, the travel of the regulator 2 in translation along the axis X1 with respect to the housing 1 is limited to two end positions against the housing 1, in which the regulator 2 is in abutment along the axis X1 against the housing 1, either in the direction X11 or in the opposite direction. Advantageously, it is envisaged that the position of the regulator 2 limits the flow rates of the flows F1 and F2 in an antagonistic manner, or inversely proportional, or so that the sum of the flow rates of the flows F1 and F2 is substantially constant for any position of the regulator 2. In other words, the regulator 2 is preferably designed to regulate the flow rates of the flows F1 and F2 in an inverse manner, which makes it possible to define, in an adjustable manner, the proportions of the mixture of the flows F1 and F2, i.e. the proportion of flow F1 and flow F2 in the composition of the flow F3. In other words, the regulator 2 allows the flow rate of the incoming water flows F1 and F2 to be adjusted, so that the regulator 2 allows a mixture with a variable, i.e. adjustable, proportion to be obtained for the flow F3. Indeed, the proportion of the flows F1 and F2 in the formation of the flow F3 is modified by the regulator 2, in particular according to the position of the regulator 2, which advantageously influences the temperature of the flow F3 thus obtained.

In order to mix the flows F1 and F2, the chambers 16 and 17 merge into the chamber 18 at the regulator 2. Here, the chamber 18 is delimited by the wall 34 and is therefore centred on the axis X1, being coaxial with the annular parts 28 and 29 of the chambers 16 and 17. In particular, the chamber 18 is directly surrounded by the chamber 16. The edge 36 advantageously defines a closed contour around the axis X1, preferably circular and centred on the axis X1, and forms an open axial end of the chamber 18, to connect the chamber 18 with the chambers 16 and 17. This open axial end faces the regulator 2, i.e. opposite to the direction X11.

The chamber 16 opens into the chamber 18, preferably directly. Here, the chamber 16 opens into the chamber 18 directly, via the gap between the face 32 of the regulator 2 and the edge 36 of the wall 34. The chamber 17 opens into the chamber 18, preferably via the regulator 2. More specifically, chamber 17 opens into chamber 18 via the gap between the face 33 of the regulator 2 and the wall 13, and then via openings 35 through the regulator 2, each opening 35 connecting the face 33 to the face 32, while the face 32 defines the chamber 18 with the wall 34. FIGS. 2 and 3 only partially show the openings 35, which are outside the respective sectional planes of these figures. From chamber 17, the flow F2 therefore preferentially reaches chamber 18 through the regulator 2.

In the chamber 18, the flows F1 and F2 mix and together become the flow F3 at the open axial end of the chamber 18 delimited by the edge 36. The chamber 18 can therefore be described as a "mixing chamber", where the flows F1 and F2 are mixed, once the proportions of the mixture have been regulated by the regulator 2.

The chamber 18 has at least one base plate opening. Each base plate opening of the chamber 18 is preferably arranged beyond the bottom wall 21 in the direction X11. In the present embodiment, as can be seen in FIGS. 1 to 3, among the base plate openings of the chamber 18, radial openings 37 and an axial opening 38 are provided. The openings 37 and 38 are formed between the two ducts 22 and 23.

When the housing 1 is coupled to the base, each base plate opening 37 and 38 opens into the interstitial chamber 63 defined between the base plate 11 and the receptacle 60 of the base, and then discharged through an outlet opening into the chamber 63, for example, to a tap spout or shower head.

This chamber 63 is traversed by the flows F1 and F2, but these flows F1 and F2 are fluidically separated from the chamber 63, since the connection of the base plate openings 24 and 25 with the base openings is sealed by the seals 26 and 27. In other words, a watertight seal is provided to separate the interstitial chamber 63 from the connection between the base plate openings 24 and 25, and the base openings. In other words, the chamber 63 is arranged annularly around the base plate openings 24 and 25, with the seals 26 and 27 delimiting the chamber 63 from the inside.

As explained below, the regulation of the regulator 2 is determined depending, on the one hand, on the configuration of the thermoactuator 3 reflecting a temperature of the flow F3, and on the other hand, on the configuration of a control chain operable by a user, comprising the slide 4, the rotary drive part 5 and the control element 7, if provided. As a result, the temperature of the flow F3, once the flows F1 and F2 have been mixed, depends both on the setting desired by the user and on a thermostatic regulation carried out by the thermoactuator 3. Furthermore, the thermostatic device is configured to move between a base configuration and an overtravel configuration, described below.

As shown in FIGS. 2 and 3, the thermoactuator 3 is in the form of a thermostatic element, comprising a primary part 70, which is constituted by a thermosensitive part of the thermostatic element, and a secondary part 71, which is constituted by a movable part, here a movable rod, of the thermostatic element. The primary part 70 and the secondary part 71 are preferably coaxial with the axis X1. The part 70 is advantageously arranged in the direction X11 with respect to the part 71.

The thermoactuator 3 passes axially through the wall 13 via an opening 73 in the wall 13, so as to be arranged partly in the compartment 14 and partly in the compartment 15. Preferably, the opening 73 is coaxial with the axis X1. The opening 73 is preferably sealed by the thermoactuator 3, in particular by the primary part 70 passing through the opening 73. Thus, a watertight seal is obtained between the compartments 14 and 15, the water flows F1, F2 and F3 circulating exclusively in compartment 15 while compartment 14 is, preferably, entirely free of water.

In particular, it is envisaged that the secondary part 71, forming a first axial end of the thermoactuator 3, extends into the control compartment 14, while the primary part 70, forming an opposite axial end of the thermoactuator 3, extends into the mixing compartment 15. In the present example, the primary part 70 is at least partially housed in the chamber 18, so as to be at least partially immersed in the flow F3 in this chamber 18. The primary part 70, due to its sensitivity to temperature, is able to drive the secondary part 71 along the axis X1, relative to the primary part 70 depending on the temperature of the flow F3. As the temperature increases, the secondary part 71 is moved in a direction opposite to the direction X11 with respect to the primary part 70. More generally, the parts 70 and 71 move relative to each other in translation along the axis X1, depending on the temperature of the flow F3.

In practice, the movable rod constituting the secondary part 71 slides relative to the primary part 70 along the axis X1. For this purpose, preferably, the primary part 70 comprises a cup, which has an opening coaxial with the axis X1 and which contains a thermoexpandable material such as a thermoexpandable wax, which expands when the temperature of the flow F3 rises and which retracts when the temperature of the flow F3 falls, in a reversible manner. The rod forming the secondary part 71 seals an opening formed at an axial end of the cup of the primary part 70, the opening of the cup guiding the sliding of the secondary part 71 relative to the primary part 70 parallel to the axis X1. The secondary part 71 is moved away from the primary part 70, i.e. in a direction opposite to the direction X11, due to the expansion of the thermoexpandable material, as this material expands. As explained below, the spring 8 serves to return the secondary part 71 towards the primary part 70 when the material shrinks, i.e. to move the secondary part 71 axially in the direction X11 relative to the primary part 70 when the temperature of the flow F3 decreases.

The regulator 2 is fixed to the primary part 70 of the thermoactuator 3, in the compartment 15. At least, it is provided that the regulator 2 and the primary part 70 are fixed in relation to each other in translation along the axis X1. Preferably, it is further provided that the regulator 2 and the part 70 are fixed relative to each other in rotation about the axis X1, the regulator 2 having no degree of freedom with respect to the part 70. In any case, the regulator 2 is driven in axial translation relative to the housing 1 by the axial translation of the primary part 70 relative to the housing 1. The regulator 2 and the part 70 translate together relative to the housing 1 along the axis X1. Preferably, the regulator 2 surrounds the heat-sensitive part about the axis X1 and is screwed thereto.

The thermoactuator 3 is axially interposed between the spring 8 and the rotary drive part 5. In the compartment 14, the secondary part 71 axially abuts the rotary drive part 5, in a direction opposite to the direction X11. In particular, the secondary part 71 axially abuts an axial surface 77 of the part 5. In the compartment 15, the primary part 70 axially abuts the spring 8 in the direction X11. Here, the primary part 70 axially abuts the spring 8 via a washer. Alternatively, it can be provided that the primary part 70 axially abuts the spring 8 via the regulator 2.

Here, the return spring 8 is a compression spring, which is axially interposed between the primary part 70 and the housing 1, in particular an armature 72 forming part of the housing 1, which partially delimits the chamber 18. Here, the return spring 8 is preferably completely accommodated in the chamber 18, being arranged, for example, coaxially with the axis X1. In particular, the armature 72 belongs to the wall 34 and partly delimits the base plate openings 37 and 38, being formed at the ducts 22 and 23 along the axis X1. More generally, an axial end of the return spring 8 applies a return force E8, known as the "secondary return force", directed away from the direction X11, this force E8 being applied on the primary part 70. The return force E8 is generated by the elasticity of the spring 8. At its other axial end, the spring 8 bears against the housing 1 in the direction X11. When the temperature sensed by the part 70 drops, the force E8 brings the parts 70 and 71 towards each other, pressing the thermoactuator 3 axially against the rotary drive part 5.

Furthermore, thanks to the force E8 applied by the spring 8 on the primary part 70 of the thermoactuator 3, the rotary drive part 5 and the secondary part 71 of the thermoactuator 3 are fixed relative to each other in translation along the axis X1. In other words, due to the fact that the force E8 holds the rotary drive part 5 and the thermoactuator 3 in axial support against each other, the part 71 and the rotary drive part 5 are integral for their position along the axis X1 with respect to the housing 1, i.e. they move together along the axis X1. Alternatively, however, it may be possible to attach the part 71 to the rotary drive part 5 so that they are mutually fixed in translation along the axis X1. Preferably, the rotary drive part 5 and the part 71 are movable relative to each other in rotation about the axis X1, i.e. nothing prevents the rotary drive part 5 from rotating relative to the part 71 about the axis X1. Thus, the end of the part 71 rotatably slides against the surface 77 of the part 5 about the axis X1. Therefore, when the rotary drive part 5 is rotating about the axis X1 relative to the housing 1, it does not rotate the thermoactuator 3 relative to the housing 1 about the axis X1.

The control element 7, if provided, is configured to allow a user to operate the regulator 2. For this purpose, the control element 7 operates the rotary drive part 5, which operates the thermoactuator 3, which operates the regulator 2.

As shown in FIGS. 2 and 3, the control element 7 passes through an opening 49 in the cover 12, which is coaxial with the axis X1 and is formed at the axial end of the housing 1 opposite the direction X11. Preferably, the element 7 seals the opening 49 through which it passes, not necessarily in a watertight manner, but at least to prevent dust from entering the compartment 14 and to prevent play.

An outer part of the control element 7, constituting a first axial end of the element 7, protrudes from the housing 1, opposite to the direction X11. The element 7 can be moved by the user relative to the housing 1 by means of this outer part, for example, by means of a button covering said outer part.

In the illustrated example, the element 7 is mounted so as to pivot about the axis X1 with respect to the housing 1, while being preferably axially fixed with respect to the housing 1. More precisely, it is advantageously provided that the control element 7 and the housing 1 are fixed relative to each other in translation along the axis X1, whereas the control element 7 and the housing 1 are movable relative to each other in rotation about the axis X1. Thus, the thermostatic device is controlled by the user simply by rotating the control element 7 relative to the housing 1 about the axis X1. This freedom in rotation and this constraint in translation is advantageously ensured by a pivot connection, formed by the opening 49 and the part of the element 7 which passes through the opening 49.

An inner part of the control element 7, constituting a second axial end of the element 7 in the direction X11, is contained in the housing 1, in particular in the control compartment 14, where the control element 7 actuates the rotary drive part 5. The control element 7, the rotary drive part 5 and the thermoactuator 3 are thus successively arranged along the axis X1 and centred on this axis.

The control element 7 and the rotary drive part 5 are fixed in relation to each other in rotation about the axis X1. In other words, the rotation of the control element 7 by the user leads to an integral rotation of the part 5 with respect to the housing 1 about the axis X1. In the case where the element 7 and the housing 1 are mutually fixed in translation along the axis X1, it is also provided that the part 5 and the element 7 are mobile with respect to each other in translation along the axis X1. In other words, while the element 7 is fixed in relation to the housing 1 for translation along the axis X1, the part 5 can freely translate along the axis X1 in relation to the element 7 and the housing 1. To achieve this, it is envisaged that the inner part of the element 7 and the part 5 together form a sliding type connection, with a function of anti-rotation about the axis X1 and sliding along the axis X1. For example, the element 7, at its axial end along the direction X11, has a male portion 75, while the rotary drive part 5 has, at its opposite axial end, a female portion 76, which is coupled to the male portion 75. The female part 76 and the axial surface 77 are axially opposite. The male part 75 and the female part 76 have, for example, a cylindrical shape with a polygonal base along the axis X1, here with a hexagonal base centred on the axis X1. Alternatively, the part 5 carries the male part while the element 7 carries the female part.

Figure 5:
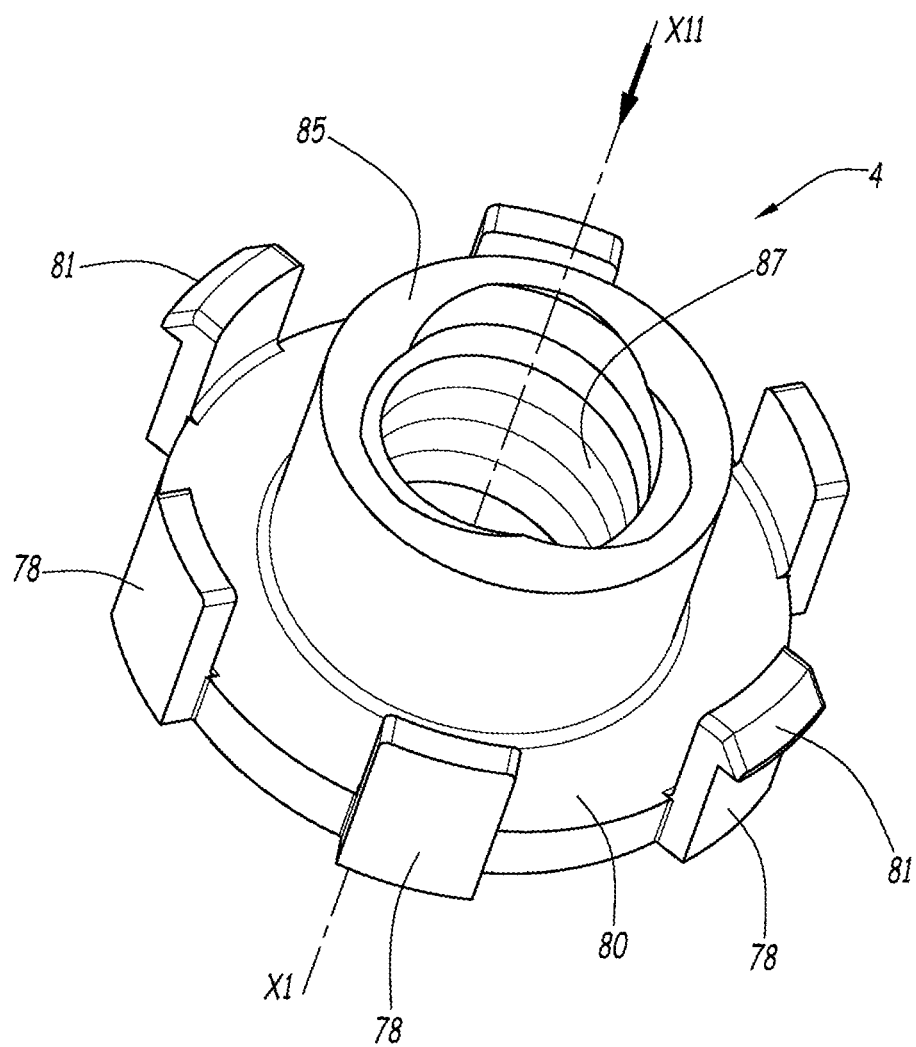
FIG. 5 is a perspective view of a slide forming part of the thermostatic device of FIGS. 1 to 4.

The slide 4 can be seen in FIGS. 2 to 4, and is shown individually in FIG. 5. In the present example, the slide 4 comprises a crown 80 and a sleeve 85.

The slide 4 is slidably mounted within the cover 12. More precisely, the slide 4 and the housing 1 are movable relative to each other in translation along the axis X1, and are fixed relative to each other in rotation about the axis X1. In other words, the slide 4 can slide relative to the housing 1 parallel to the axis X1, but cannot pivot relative to the housing 1 about the axis X1. For this purpose, the slide 4 is slid along the axis X1 by the cover 12, and part of the cover 12 surrounds the slide 4 around the axis X1. In order to be able to slide while being prevented from rotating, it is preferably provided that the slide 4 comprises external axial grooves 78, while the cover 12, for the part which surrounds the slide 4, comprises internal axial grooves 79, which cooperate with the grooves 78.

As best seen in FIG. 5, the crown 80 has, for example, a washer shape, which is centred on the axis X1. The ring 80 carries the sleeve 85 at its inner edge. As illustrated, the sleeve 85 rises from the inner edge of the crown 80 in the opposite direction to the direction X11.

The rim 80 has lugs on its periphery oriented parallel to the axis X1, each lug forming one of the grooves 78, in the form of male grooves. Each lug extends from the outer edge of the crown 80 in the opposite direction to the direction X11. For example, the grooves 78 are evenly distributed around the axis X1. Here, six lugs, and thus six grooves 78 are provided. As a minimum, at least one groove 78 is provided.

As best seen in FIGS. 2 to 4 the cover 12 carries grooves, oriented parallel to the axis X1, each groove forming one of the grooves 79, in the form of female grooves. Each groove forming a groove 79 receives one of the tabs forming the corresponding groove 78 in an axially sliding manner. There is thus mutual mechanical cooperation of the pairs of grooves 78 and 79 to allow axial sliding without rotation of the slide 4 with respect to the cover 12. For example, like the grooves 78, the grooves 79 are regularly distributed around the axis X1 and are six in number. As a minimum, at least one groove 79 is provided. Alternatively, some or all of the grooves 79 form male grooves, being formed in relief by the cover 12, while the corresponding grooves 78 form female grooves formed in recess by the slide 4.

The mobility of the slide 4 and the housing 1 relative to each other in translation along the axis X1 is limited, in a direction opposite to the direction X11, to a position known as the "base position". In this base position, shown in FIGS. 2 to 4, the slide 4 is in axial abutment against the housing 1 in a direction opposite to the direction X11. To achieve this axial stop, it is provided, for example, that the crown 80 of the slide 4 comes into abutment against the wall 13 of the housing 1, as shown in FIGS. 2 to 4.

Alternatively or additionally, it may be provided that some or all of the grooves 78 and 79 have mutual axial stop surfaces to limit the translational travel of the slide 4 relative to the housing 1 to the base position.

As shown in FIGS. 2 to 4, the overtravel spring 6 is preferably a single helical compression spring, coaxial with the X1 axis.

The spring 6 is arranged in the compartment 14. For example, the spring 6 extends radially around the rotary drive part 5 and the sleeve 85 of the slide 4. Preferably, the spring 6 extends radially around the axial end along the direction X11 of the element 7. Radially, the spring 6 is arranged between the sleeve 85 and the grooves 78.

The spring 6 is axially interposed between the cover 12 and the slide 4, in order to exert a return force E6 on the slide 4, along the direction X11, by bearing against the housing 1. The return force E6 is called the "primary return force". The return force E6 is generated by the elasticity of the spring E6. For this purpose, a first axial end of the spring 6 bears against the ring 80 of the slide 4 in the direction X11, for example, while a second axial end bears against an axial wall 84 of the cover 12 in the opposite direction. The force E6 tends to maintain the slide 4 in the base position, where the slide 4 abuts the housing 1 in the direction X11. To move the slide 4 away from the home position, the slide 4 must be moved against the force E6. In order for the spring 6 and the slide 4 to be able to absorb an overtravel of the thermoactuator 3, the thermoactuator 3 is configured so that, when the temperature of the flow F3 increases, the secondary part 71 moves relative to the primary part 70 along the axis X11 in a direction opposite to the direction of the primary return force E6, i.e. opposite to the direction X11. It follows that the forces E6 and E8 are in opposite directions. For this reason, it is advantageous to provide that the springs 6 and 8 are antagonistic.

When the thermostatic device is in the base configuration, the slide 4 is in the base position. In the base configuration, it is the spring 6 that holds the slide 4 in the base position under the action of force E6. It is therefore as if the slide 4 is fixed in relation to the housing 1, both in rotation about the axis X1 and in translation along the axis X1. When the slide 4 is moved away from its base position against the force E6 according to the operation described below, the thermostatic device is in the overtravel configuration.

In the illustrated example, the sleeve 85 of the slide 4 radially surrounds the rotary drive part 5. More generally, it is intended that the slide 4 surrounds the rotary drive part 5 around the axis X1. The slide 4 has an internal thread 87, which is coaxial with the axis X1 and which is here carried by the sleeve 85 on its inner surface. As the slide 4 carries an internal thread 87, the slide 4 can be described as a nut. As can be seen in FIG. 5, the thread 87 is preferably formed by several intertwined helical threads, here three, for better mechanical strength. However, at least one thread is provided. Conversely, the rotary drive part 5 comprises an external thread 88, which is coaxial with the axis X1, and which is here carried by a radial surface of the rotary drive part 5, connecting the axial surface 77 to the opposite axial end of the rotary drive part 5. Carrying an external thread 88, the rotary drive part 5 can be described as a screw. The same number of threads is provided for the thread 88 as for the thread 87.

The threads 87 and 88 cooperate with each other by being screwed into each other. By this screwed cooperation, the slide 4 and the rotary drive part 5 are in helical connection with each other along and about the axis X1. In detail, a rotation of the rotary drive part 5 about the axis X1 relative to the slide 4 results in a translational movement of the nut relative to the rotary drive part 5 along the axis X1, with a constant ratio between the angular distance covered by the part 5 and the linear distance covered by the slide 4. More generally, the slide 4 and the part 5 form a screw-nut system. Preferably, this screw-nut system is irreversible, in that a translational movement of the slide 4 does not lead to a rotation of the rotary drive part 5, the rotary drive part 5 then being driven in translation integrally with the slide 4 along the axis X1, without rotation of one with respect to the other.

The thermostatic device is particularly compact and its parts are simple in shape, particularly due to the fact that the spring 6 radially surrounds the screw-nut system, at least with regard to the helical connection formed by the threads 87 and 88.

When the rotary drive part 5 is rotated about the axis X1 relative to the housing 1, e.g. by rotating the element 7 about the axis X1 relative to the housing 1, the part 5 is moved relative to the slide 4 along the axis X1. In the base configuration, where the slide 4 is held in the base position by the spring 6, i.e. fixed with respect to the housing 1, the translation of part 5 takes place with respect to the housing 1 and with respect to element 7 along the axis X1. This translation of part 5 with respect to element 7 is permitted by the sliding coupling of the male 75 and female 76 parts. The translation of the part 5 with respect to the housing 1 causes the secondary part 71 of the thermoactuator 3 to be moved in translation along the axis X1 with respect to the housing 1, which, subject to the position of the primary part 70 with respect to the secondary part 71, regulates the translational position of the regulator 2 with respect to the housing along the axis X1. The relative position of the parts 70 and 71 then applies a correction to the position of the regulator 2 relative to the housing 1 along the axis X1 depending on the temperature of the flow F3.

Under the action of the rotary drive part 5 and the thermoactuator 3, the regulator 2 can be driven to its two translational end positions relative to the housing 1 along the axis X1, where the regulator is in axial abutment against the housing 1. When the regulator 2 is in the end position, in which the regulator 2 is in axial abutment along the direction X11, i.e. against the edge 36 of the chamber 18, it may occur that the thermoactuator 3 causes the part 71 to move in the opposite direction of the direction X11 with respect to the part 70, as a result of a high temperature of the flow F3. In this situation, part 70 and housing 1 are fixed relative to each other in translation along the axis X11 by means of the regulator 2, in axial abutment against housing 1. The rotary drive part 5 is then subjected to the force generated by the thermoactuator 3 via part 71. This force is taken up by the slide 4 by the irreversibility of the helical connection with the rotary drive part 5. This force is in turn taken up by the spring 6, which then authorises a translational movement of the slide 4 with respect to the housing 1 in the opposite direction to the direction X11, the slide 4 then being moved away from the base position. In summary, in the overtravel configuration, when the regulator 2 is in the end position, an assembly formed by the secondary part 71, the rotary drive part 5 and the slide 4 is jointly moved in translation along the axis X1, in the opposite direction to the direction X11, under a force generated by the thermoactuator 3 in the opposite direction to the direction X11, against the force E6. To transmit such a force, the thermoactuator 3 bears against the housing 1 by means of its primary part 70 and the regulator 2. In the example shown, the spring 6 is then axially compressed.

It is intended that the springs 6 and 8 are configured so that the primary return force E6 is higher, i.e. greater, than the secondary return force E8, so that the return spring 8 cannot overcome the overtravel spring 6 in the base configuration of the thermostatic device. For example, it is intended that the force E6 is twice as high as the force E8, or even five times as high. This is because it is intended that the spring 6 can only be overcome by a force generated by the thermoactuator 3, while the thermoactuator 3 bears against the housing 1 via the regulator 2 in the end position.

It has been seen that the return force E8, being directed in the opposite direction to the direction X11, maintains the thermoactuator 3 in axial support in the opposite direction to the direction X11, the part 71 being in support against the axial surface 77. In the overtravel configuration, the regulator 2 is supported against the housing 1 against the force E8. In this situation, the return force E6 being directed in the direction X11, the spring 6 keeps the rotary drive part 5 in contact in the direction X11 with the secondary part 71 of the thermoactuator 3, when the regulator 2 is in contact with the housing 1 in the direction X11 and the slide 4 is moved away from its base position. In other words, in the overtravel configuration, the axial support between the part 71 and the rotary drive part 5 is obtained on the one hand thanks to the force E6, and on the other hand thanks to the force E8 and the force produced by the thermoactuator 3, taken up by the housing 1 via the setting of the end of travel position of the regulator 2.

It should be noted that the parts constituting the thermostatic device are particularly simple and compact in shape. For example, the rotary drive part 5 has the shape of a threaded rod, while the slide 4 has the shape of a grooved nut. Advantageously, the element 7 has the shape of a screwdriver. It follows that these parts can substantially be formed individually by moulding into a monolithic polymer plastic part. For greater mechanical strength, however, it may be chosen that all or some of these parts are manufactured differently.

A method of manufacturing the thermostatic device of FIGS. 1 to 5 may be provided, which includes the supply or manufacture of the base plate 11, the cover 12, the regulator 2, the thermoactuator 3, the slide 4, the rotary drive part 5, the spring 6, as well as the element 7 and the spring 8 if they are provided. Many parts, such as the cover 12, the regulator 2, the slide 4 and the rotary drive part 5, are advantageously produced by individual moulding of a particular monolithic part. It is advantageously provided that the element 7 is obtained by machining. Preferably, each part thus moulded is made of polymeric plastic.

While the cover 12 is not yet assembled with the base plate 11, the spring 6 and the element 7, if provided, are advantageously mounted on the cover 12 via the opening 83. The slide is mounted in the cover 12 against the force E6 produced by the spring 6, if necessary by making the grooves 78 and 79 cooperate. Preferably, the rotary drive part 5 is screwed to the slide 4 before the slide is mounted in the cover 12. When the rotary drive part 5 is received in the cover 12, care is taken to ensure that the part 5 is connected to the element 7, if provided.

Preferably, to facilitate assembly, as shown in FIGS. 4 and 5, at least one lug forming one of the grooves 78 of the slide 4 has a hook 81, which abuts axially against an axial wall of an abutment notch 82, formed by the cover 12 at the end of the corresponding groove 79. Preferably, as illustrated, at least two hooks 81 are provided, cooperating with two respective diametrically opposed stop notches 82. When mounting the slide 4 in the cover 12, the hooks 81 are engaged with the notches 82 to hold the slide 4 in the cover 12 despite the force E6 provided by the spring 6. In detail, the slide is threaded, which deforms the lugs carrying the hooks 81 radially inwards, until the hooks 81 are captured in their respective notches 82, where the lugs return to their original shape. The force E6 then brings the slide 4 to bear in direction X11 against the cover, by bringing the hooks 81 into abutment against the notches 82.

Once the cover is assembled with the slide 4, the part 5, the spring 6, and possibly the element 7, the base plate 11 is fixed on the cover 12, so that the wall 13 closes the opening 83.

Before or after the cover 12 is assembled with the base plate 11, the thermoactuator 3 and the regulator 2 are mounted in the base plate 11, preferably after the thermoactuator 3 and the regulator 2 have been assembled together.

Alternatively, rather than being a cartridge, the device directly forms a valve body, with the housing 1 preferably forming a facing outer shell.

Alternatively, rather than forming a spool, the regulator 2 forms a shutter to regulate the flow of a single flow of water conducted into the housing 1.

Alternatively, instead of or in addition to adjusting the flow rate of an incoming water flow, the regulator can adjust the flow rate of an outgoing water flow.

Alternatively, rather than adjusting the water flow rate in an antagonistic manner, the regulator can adjust the flow rate proportionally.

Alternatively, the thermostatic device can be designed to conduct a single inflow that forms a single outflow, the flow rate of which is set by the regulator.

Alternatively, it is envisaged that the control element 7 is in the form of a lever, pivoting about an axis with respect to the housing 1, which may be different from the axis X1, and which drives the part 5 by means of a suitable mechanical transmission.

Alternatively, it is possible to provide for an absence of the control element 7, the part 5 then comprising an appendix projecting from the housing 1 to be actuated directly by the user. Alternatively, it is possible to provide for an absence of the control element 7, the part 5 being actuated by an actuator controlled by a PLC or any system external to the thermostatic device.

Alternatively, the thermoactuator operates without a return spring, being able to return the secondary part to the primary part when the temperature drops. The presence of the spring 8 is then not necessary. For example, for this purpose the thermoactuator is a shape memory alloy part, the primary and secondary parts being formed, for example, by two axial ends of the shape memory alloy part.

Figure 6:
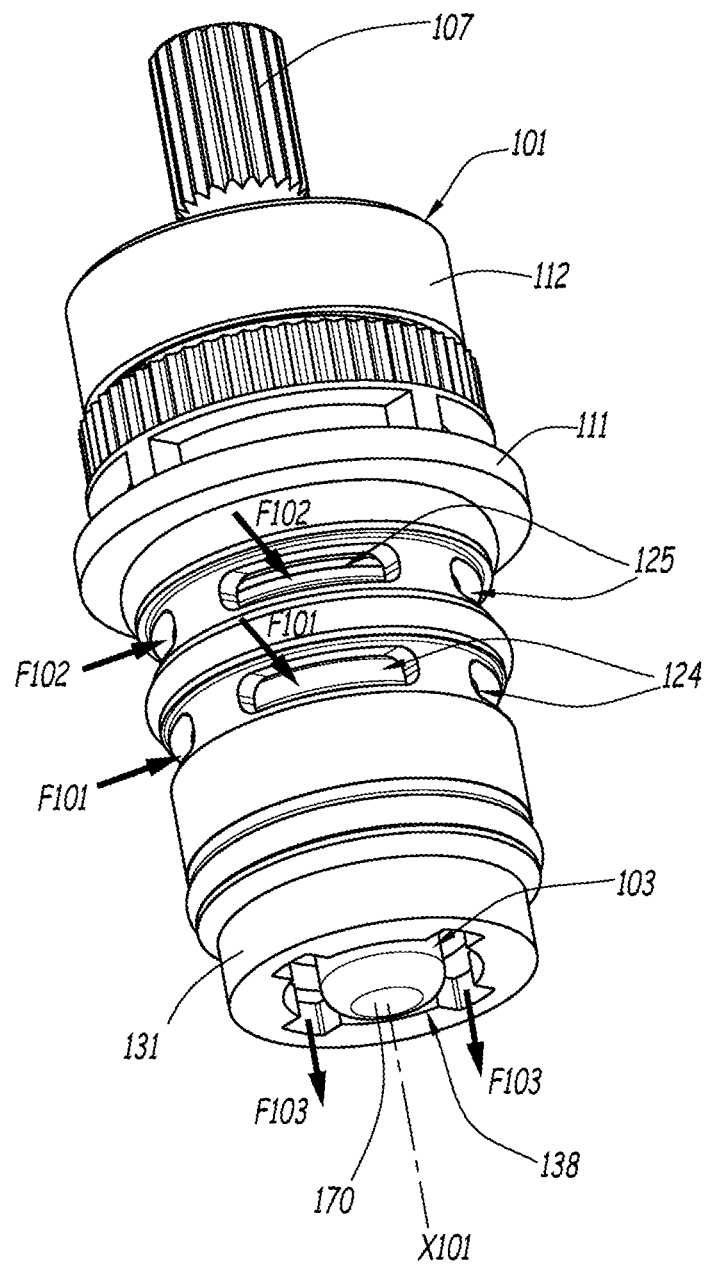
FIG. 6 is a perspective view of a thermostatic device according to a second embodiment of the invention.
Figure 7:
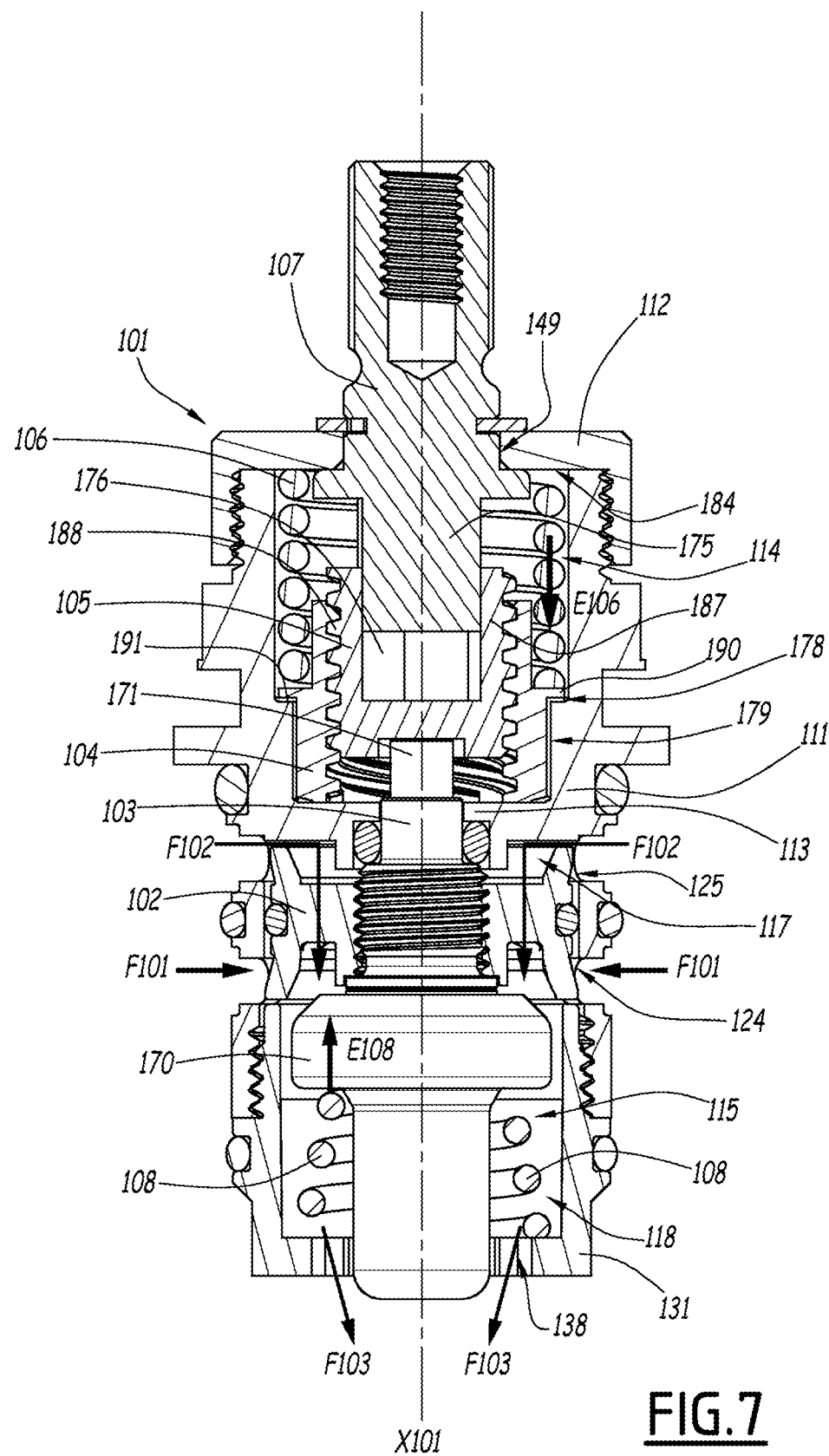
FIG. 7 is a longitudinal cross section of FIG. 6.
Figure 8:
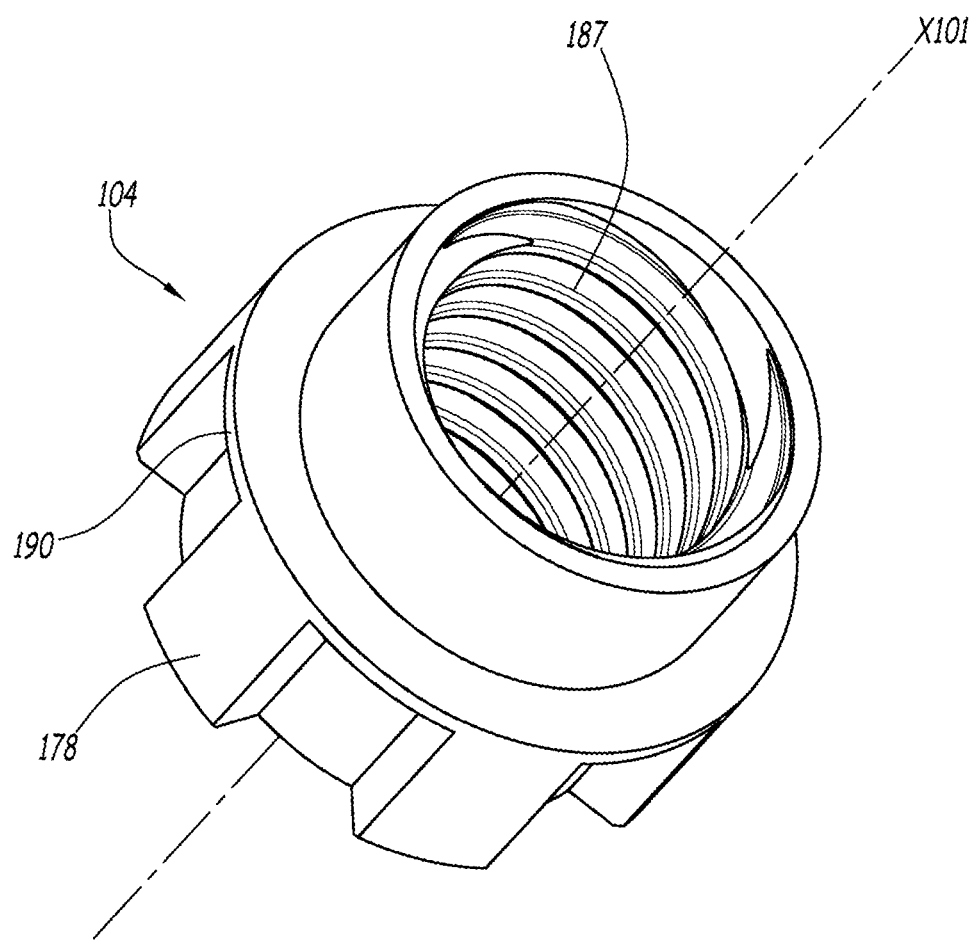
FIG. 8 is a perspective view of a slide forming part of the thermostatic device of FIGS. 6 to 7.

FIGS. 6 to 8 show a thermostatic device according to a second embodiment of the invention. The features, operation and construction of the thermostatic device in FIGS. 6 to 8 is the same as that in FIGS. 1 to 5, except for the differences mentioned below. The same terms are used and the same reference signs increased by 100 are used to designate similar features between the embodiment of FIGS. 1 to 5 and the embodiment of FIGS. 6 to 8.

Preferably, this thermostatic device constitutes a thermostatic cartridge for a thermostatic bathtub or shower faucet, with a first temperature control knob operating this thermostatic cartridge, and another flow control knob, the two knobs being axially opposite each other.

As best seen in FIGS. 6 and 7, this thermostatic device comprises a housing 101, which is configured to conduct incoming water flows F101 and F102 and an outgoing water flow F103 therein. Advantageously, it is envisaged that the flow F101 is a hot water flow and the flow F102 is a cold water flow. The housing 101 forms a control compartment 114 and a mixing compartment 115 distributed along a longitudinal axis X101 of the housing 101, and separated by a transverse wall 113 forming part of the housing 101.

As seen in FIG. 7, this thermostatic device comprises a regulator 102, which is contained in the compartment 115 of the housing 101, the regulator 102 and the housing 101 being movable relative to each other in translation along the longitudinal axis X101, to adjust the flow rate of the water flows F101 and F102. Preferably, the regulator 102 and the housing 101 are movable relative to each other in translation along the longitudinal axis X101, between two end positions of the regulator 102 relative to the housing 101, in which the regulator 102 is in abutment against the housing 101 along the longitudinal axis X101. In a first end position in which the flow rate F102 is at its lowest and the flow rate F101 is at its highest, the regulator 102 is, for example, in abutment against an edge of the opening 125 in order to close it, this edge being formed, for example, by the wall 113 of the housing 101. In a second end-of-stroke position in which the flow rate of the flow F102 is at its highest while the flow rate of the flow F101 is at its lowest, the regulator 102 is, for example, in abutment against an edge of the opening 124 in order to close it, this edge being formed by the housing 101.

The thermostatic device comprises a mixer, which is formed by the regulator 102 and the mixing compartment 115. The mixer being configured to form the outgoing water flow F103 by mixing two incoming water flows F101 and F102. The compartment 115 comprises an inlet chamber 117 conducting the flow of the flow F102 and a mixing chamber 118 into which the flows F101 and F102 are admitted to form the flow F103 by mixing the flows F101 and F102. The chambers 117 and 118 are annular, centred on the axis X101. The chambers 117 and 118 are successively arranged along the axis X101. In particular, chamber 118 is formed at an axial end of the housing 101 while chamber 117 is axially interposed between the wall 113 and chamber 118. The chambers 117 are delimited from each other by the regulator 102.

Flow F101 is admitted to chamber 118 directly from the outside via radial base plate openings 124 in housing 101, formed at the periphery of chamber 118. Flow F102 is admitted to chamber 118 via ports through the regulator, with flow F102 coming from chamber 117. The flow F102 into chamber 117 is admitted directly from the outside via radial base plate openings 125 of the housing 101, formed at the periphery of chamber 117. The discharge of the flow F103 from the chamber 118 is effected directly to the outside via an axial base opening 138, for example, of annular shape.

The position of the regulator 102 relative to the housing 101 along the longitudinal axis X101 adjusts the flow rate of the incoming water flows F101 and F102 in an inverse manner, by varying the degree of closure of the base plate openings 124 and 125 by the regulator 102, to determine the proportion of the incoming water flows F101 and F102 forming the outgoing water flow.

The thermostatic device comprises a thermoactuator 103, which is contained in the housing 101, so as to be immersed in the water flow F103. The thermoactuator 103 comprises a primary part 170 and a secondary part 171 which move relative to each other in translation along the longitudinal axis X101, depending on the temperature of the flow F103 in which the primary part 170, which is thermosensitive, is immersed. The primary part 170 is substantially contained in the chamber 118 to be immersed in the flow F103. The primary part 170 and the regulator 102 are fixed in translation relative to each other along the longitudinal axis X101. Thus, the thermoactuator 103 moves the spool in translation along the axis X101 relative to the housing 101 depending on the temperature of the flow F103 to thermoregulate the mixing.

In this example, the thermoactuator 103 is configured so that, when the temperature of the flow F103 increases, the secondary part 171 is moved, in a driving manner relative to the primary part 170 along the longitudinal axis X101, away from the primary part 170. As the thermoactuator 103 is preferably a thermostatic element, of which the part 170 is a thermosensitive part and the part 171 is a rod that can slide with respect to the part 170, the thermostatic device advantageously comprises a return spring 108 that applies a secondary return force E108 on the primary part 170 along the longitudinal axis X101, by bearing against the housing 101 along the longitudinal axis X101. The function of the spring 108 is to return the part 171 relative to the part 170 when the temperature of the flow F103 drops. The thermoactuator 103 passes through the wall 113, so that the secondary part 171 extends into the control compartment 114.

In the control compartment 114, the thermostatic device comprises a slide 104. The slide 104 and the housing 101 are movable relative to each other in translation along the longitudinal axis X101 and fixed relative to each other in rotation about the longitudinal axis X101. Preferably, the slide 104 comprises external axial grooves 178, which can be seen in FIG. 8, while the housing comprises internal axial grooves 179. The grooves 178 and 179 cooperate with each other so that the slide 104 and the housing 101 are movable relative to each other in translation along the longitudinal axis X101 and fixed relative to each other in rotation about the longitudinal axis X101. Preferably, the slide 104 and the housing 101 are movable relative to each other in translation along the longitudinal axis X101, to a home position, shown in FIG. 7, in which the slide 104 abuts the housing 101, along the longitudinal axis X101. As shown in FIGS. 7 and 8, the slide 104 advantageously comprises a stop collar 190, formed at an axial end of the grooves 178, which abuts axially against an internal axial shoulder 191, formed by the housing 101 in the compartment 114. Alternatively, it is provided that the slide 104 comes into axial abutment against the wall 113.

In the control compartment 114, the thermostatic device comprises an overtravel spring 106, which applies a primary return force E106 on the slide 104 along the longitudinal axis X101. In order to apply the primary return force E106 on the slide, the overtravel spring 106 bears against the housing 101 along the longitudinal axis X101. Preferably, the overtravel spring 106 is formed by a helical compression spring centered on the longitudinal axis X101, which is interposed, along the longitudinal axis X101, between the slide 104 and an axial surface 184 forming part of the housing 101. The thermoactuator 103 is configured so that, when the temperature of the flow F103 increases, the secondary part 171 is moved in a driving manner relative to the primary part 170 along the longitudinal axis X101, in a direction opposite to the direction of the primary return force E106.

The primary return force E106 and the secondary return force E108 are advantageously in opposite directions. The overtravel spring 106 and the return spring are configured so that the force E106 is higher than the force E108.

The thermostatic device comprises a rotatable drive element 105. The rotary drive part 105 and the slide 104 are helically connected to each other along and about the longitudinal axis X101. The rotary drive part 105 and the secondary part 171 are fixed relative to each other in translation along the longitudinal axis X101. Preferably, in order for the rotary drive part 105 and the secondary part 171 to be fixed relative to each other in translation along the longitudinal axis X101, the thermoactuator 103 and the rotary drive part 105 are held in abutment against each other along the longitudinal axis X101 under the action of the secondary return force E108.

Preferably, the rotating drive element 105 constitutes a screw, in that it comprises an external thread 188 centred on the longitudinal axis X101, whereas the slide 104 constitutes a nut, in that it comprises an internal thread 187 centred on the longitudinal axis X101. The internal thread 187 and the external thread 188 cooperate with each other so that the rotating drive element 105 and the slide 104 are in helical connection with each other along and about the longitudinal axis X101, the slide 104 surrounding the rotating drive element 105 about the longitudinal axis X101. Preferably, the overtravel spring 106 is arranged so as to surround the internal thread 187 of the slide 104, thereby further surrounding the rotary drive part 105.

Preferably, the slide 104, the overtravel spring 106 and the rotary drive part 105) are arranged on one side of the transverse wall 113 while the regulator 102 is arranged on another side of the transverse wall 113 so as to be separate from it.

As seen in FIGS. 6 and 7, preferably the thermostatic device comprises a control element 107 which projects from the housing 101 to be operated by a user with respect to the housing 101. The control element 107 and the housing 101 are fixed relative to each other in translation along the longitudinal axis X101 and movable relative to each other in rotation about the longitudinal axis X101. For this purpose, the control element 107 is mounted so as to pivot with respect to the housing 101 by passing through an opening 149 in the housing 101. Passing through this opening, a part of the element 107, operable by the user, extends axially out of the housing 101, while another part of the element 107, extends into the compartment 114 to operate the rotary drive part 105.

The control element 107 and the rotary drive part 105 are movable relative to each other in translation along the longitudinal axis X101 and are fixed relative to each other in rotation about the longitudinal axis X101. To this end, a sliding anti-rotation connection is provided, comprising a complementary male portion 175 and female portion 176. For example, the male portion 175 is formed by the portion of the element 107 that extends into the compartment 114, while the female portion 176 is formed by the rotating drive element 105.

The thermostatic device is configured to move between a base configuration, shown in FIG. 7, and an overtravel configuration. In the base configuration, the slide 104 is held in the base position by the primary return force E106. In the overtravel configuration, while the regulator 102 is in one of the end positions where the flow rate F101 is most reduced, the slide 104 is moved away from the base position by the rotating drive element 105, against the primary return force E106, under the action of the thermoactuator 103.

The housing 101 comprises a cover 112 and a base plate 111 and, optionally, a cover 131. Each of the three parts is a single monolithic piece.

The base plate 111 forms the wall 113 with the axis X101 passing through it.

On the side of the compartment 114, axially from the wall 113, the base plate 111 forms a peripheral wall which is centred on the axis X101 and which radially surrounds the slide 104, the rotary drive part 105, the spring 106 and a part of the control element 107 which is received in the compartment 114. Thus, the base plate 111 radially delimits a part, or even the entire compartment 114. Advantageously, the base plate 111 forms the grooves 179 and the axial shoulder 191.

On the side of the compartment 114, the base plate 111 has an open axial end, which is covered by the cover 112, which closes this open axial end. For this purpose, the cover 112 is, for example, screwed onto the base plate 111 at this open axial end. The cover 112 axially delimits the compartment 114 opposite the wall 113. The cover 112 forms the opening 149 and is penetrated by and supported by the control element 107. The cover 112 also forms the axial surface 184 on which the spring 106 is axially supported.

On the side of the compartment 115, axially from the wall 113, the base plate 111 forms another peripheral wall which is centred on the axis X101 and which radially surrounds the part 170 of the thermoactuator 103, the regulator 102, or even the spring 108. Thus, the base plate 111 radially delimits a part, or even the entire compartment 115. In particular, the base plate 111 entirely delimits the chamber 117 and part of the chamber 118. The base plate 111 advantageously forms the base plate openings 124 and 125 as well as the axial stops limiting the translational travel of the regulator 102.

On the side of the compartment 115, the base plate 111 has an open axial end, which is capped by the cover 131. For this purpose, the cover 131 is, for example, screwed onto the base plate 111 at this open axial end. The cover 131 axially delimits the compartment 115 opposite the wall 113. The base plate 111 and the cover 131 together define the chamber 118. The cover 131 forms the opening 138. The spring 108 axially bears against the cover 131.

A method of manufacturing the thermostatic device may be provided, which includes the supply or manufacture of the base plate 111, the covers 112 and 131, the regulator 102, the thermoactuator 103, the slide 104, the rotary drive part 105, the spring 106, and the element 107 and the spring 108, if provided. Numerous parts such as the cover 112, the base plate 111, the cover 131, the regulator 102, the slide 104 and the rotating drive 105 are advantageously produced by individual moulding of a particular monolithic part.

While the cover 112 is not yet assembled with the base plate 111, the slide 104, the rotary drive part 105, the element 107 and the spring 106 are advantageously mounted on the base plate 111 via its axial end which is open on the side of compartment 114. The cover 112 is then screwed onto the base plate 111 against the force E106 of the spring 106, and the element 107 is then fixed axially with the cover 112, for example, by means of a spring washer.

Before or after the slide 104, the rotating drive 105 and the spring 106 have been added to the base plate 111 and the cover 112 has been screwed onto the base plate 111, and while the cover 131 has not yet been assembled with the base plate 111, the thermoactuator 103 preassembled with the regulator 102 and the spring 108 are advantageously mounted on the base plate 111 via its axial end open on the side of the compartment 115. The cover 131 is then screwed onto the base plate 111 against the force E108 of the spring 108.

Each feature described above for one embodiment or variant may be applied to any other embodiment and variant described above, as far as technically possible.

The invention claimed is:

1. A thermostatic device, comprising:
   a housing, which is configured to conduct water flows therein;
   a regulator, which is contained in the housing, the regulator and the housing being movable relative to each other in translation along a longitudinal axis of the housing, in order to regulate the flow rate of at least one of said water flows;
   a thermoactuator, which is contained in the housing to be immersed in one of said water flows, the thermoactuator comprising a primary part and a secondary part which move relative to each other in translation along the longitudinal axis, depending on the temperature of the water flow in which the thermoactuator is immersed, the primary part and the regulator being fixed relative to each other in translation along the longitudinal axis;
   a slide, the slide and the housing being:
   movable relative to each other along the longitudinal axis, and
   fixed relative to each other in rotation about the longitudinal axis; and
   an overtravel spring, which applies a primary return force on the slide along the longitudinal axis;
   wherein:
   in order to apply the primary return force on the slide, the overtravel spring bears against the housing along the longitudinal axis; and
   the thermostatic device further comprises a rotary drive part, the rotary drive part and the slide being helically connected to each other along and about the longitudinal axis, the rotary drive part and the secondary part being fixed relative to each other in translation along the longitudinal axis.

2. The thermostatic device according to claim 1, wherein:
   the thermostatic device comprises a control element which protrudes from the housing so as to be operated by a user with respect to the housing;
   the control element and the housing are:

fixed relative to each other in translation along the longitudinal axis, and movable relative to each other in rotation about the longitudinal axis; and the control element and the rotary drive part are:

movable relative to each other in translation along the longitudinal axis, and fixed to each other in rotation about the longitudinal axis.

3. The thermostatic device according to claim 2, wherein:

the housing comprises a transverse wall through which the thermoactuator passes, with the slide, the overtravel spring and the rotary drive part being arranged on one side of the transverse wall and the regulator being arranged on another side of the transverse wall; and the regulator and the housing are movable relative to each other along the longitudinal axis up to a second end position of the regulator relative to the housing, opposite the first end position, in which the regulator abuts the housing along the longitudinal axis.

4. The thermostatic device according to claim 1, wherein:

the regulator and the housing are movable relative to each other in translation along the longitudinal axis, up to a first end position of the regulator relative to the housing, in which the regulator abuts the housing along the longitudinal axis;

the slide and the housing are movable relative to each other in translation along the longitudinal axis up to a base position, in which the slide abuts the housing along the longitudinal axis; and the thermostatic device is configured to move between:

a base configuration, in which the slide is held in the base position under the action of the primary return force; and an overtravel configuration, in which, while the regulator is in the first end position, the slide is moved away from the base position by the rotary drive part, against the primary return force, under the action of the thermoactuator.

5. The thermostatic device according to claim 1, wherein:

the slide comprises external axial grooves;

the housing comprises internal axial grooves;

the internal axial grooves and the external axial grooves cooperate with each other such that the slide and the housing are:

movable relative to each other in translation along the longitudinal axis, and fixed to each other in rotation about the longitudinal axis.

6. The thermostatic device according to claim 5, wherein the overtravel spring:

comprises a helical compression spring centred on the longitudinal axis;

is interposed, along the longitudinal axis, between the slide and an axial surface forming part of the housing; and is arranged so as to surround the internal thread.

7. The thermostatic device according to claim 1, wherein:

the rotary drive part comprises an external thread centred on the longitudinal axis;

the slide comprises an internal thread centred on the longitudinal axis; and the internal thread and the external thread cooperate with each other such that the rotary drive part and the slide are in helical connection with each other along and about the longitudinal axis, the slide surrounding the rotary drive part about the longitudinal axis.

8. The thermostatic device according to claim 1, wherein:

the thermostatic device further comprises a return spring, which applies a secondary return force on the primary part of the thermoactuator or on the regulator along the longitudinal axis, by bearing against the housing along the longitudinal axis;

the primary return force and the secondary return force are in opposite directions; and the overtravel spring and the return spring are configured such that the primary return force is higher than the secondary return force.

9. The thermostatic device according to claim 8, in which, in order for the rotary drive part and the secondary part to be fixed relative to each other in translation along the longitudinal axis, the thermoactuator and the rotary drive part are held in abutment against each other along the longitudinal axis under the action of the secondary return force.

10. The thermostatic device according to claim 1, wherein the thermoactuator is configured such that, when the temperature increases, the secondary part moves with respect to the primary part along the longitudinal axis, in a direction opposite to the direction of the primary return force.

11. The thermostatic device according to claim 1, wherein:

the thermostatic device comprises a mixer, which is formed by the regulator and/or by a mixing compartment forming part of the housing, the mixer being configured to form an outgoing water flow by mixing two incoming water flows, the incoming water flows and the outgoing water flow forming part of said water flows conducted in the housing; and the position of the regulator relative to the housing along the longitudinal axis regulates the flow rate of the incoming water flows to determine the proportion of the incoming water flows forming the outgoing water flow.

* * * * *